(12) United States Patent
Matsumoto

(10) Patent No.: US 6,856,370 B2
(45) Date of Patent: Feb. 15, 2005

(54) ACTIVE MATRIX LIQUID CRYSTAL DISPLAY UNIT HAVING LIQUID CRYSTAL MOLECULES LESS ARRANGED LIKE SPRAY PATTERN AND ALONG BENT LINE

(75) Inventor: Kimikazu Matsumoto, Tokyo (JP)

(73) Assignee: NEC LCD Technologies, Ltd., Kanagawa (JP)

(*) Notice: Subject to any disclaimer, the term of this patent is extended or adjusted under 35 U.S.C. 154(b) by 0 days.

(21) Appl. No.: 09/932,029

(22) Filed: Aug. 20, 2001

(65) Prior Publication Data

US 2002/0047974 A1 Apr. 25, 2002

(30) Foreign Application Priority Data

Aug. 22, 2000 (JP) .............................. 2000-250902

(51) Int. Cl.⁷ ................................................ H01T 13/02
(52) U.S. Cl. ........................ 349/141; 349/142; 349/143
(58) Field of Search ................................ 349/141, 140, 349/142, 177

(56) References Cited

U.S. PATENT DOCUMENTS

| | | | | |
|---|---|---|---|---|
| 4,542,960 A | * | 9/1985 | Yang | 349/141 |
| 6,493,055 B1 | * | 12/2002 | Shimoshikiryo et al. | 349/141 |
| 2002/0033922 A1 | * | 3/2002 | Hidehira et al. | 349/141 |
| 2002/0105612 A1 | * | 8/2002 | Ohta et al. | 349/141 |
| 2002/0140891 A1 | * | 10/2002 | Tomioka et al. | 349/141 |
| 2002/0154262 A1 | * | 10/2002 | Yamakita et al. | 349/141 |

FOREIGN PATENT DOCUMENTS

| | | | |
|---|---|---|---|
| EP | 667555 | * | 8/1995 |
| JP | 7-225388 | * | 8/1995 |
| JP | 7-306417 | | 11/1995 |
| JP | 07-306417 | | 11/1995 |
| JP | 09-236819 | | 9/1997 |
| JP | 9-269472 | | 10/1997 |
| JP | 10-148826 | | 6/1998 |
| JP | 10-232411 | | 9/1998 |
| JP | 10-301141 | | 11/1998 |
| JP | 11-30784 | | 2/1999 |
| JP | 11-030784 | | 2/1999 |
| JP | 11-064892 | | 3/1999 |
| JP | 11-119237 | | 4/1999 |
| JP | 11-142883 | | 5/1999 |
| JP | 2000-111957 | | 4/2000 |
| JP | 2000-131717 | | 5/2000 |
| JP | 2001-290168 | | 10/2001 |
| JP | 2001-311956 | | 11/2001 |
| KR | 1999-52811 | | 7/1999 |
| WO | WO98/27454 | | 6/1998 |

OTHER PUBLICATIONS

BIREndra Bahadur, "Liquid Crystals< Applications and uses" vol. 1 pp. 165–170.*

SUkekazu Aratani et al., Complete suppersion of clor shift in inplane switching mode liquid crystal dispalys with a multidomain structure obtained by unidirectional rubbing, CLEO? Pacific Rim 93.*

Korean Office Action dated Nov. 26, 2003, with Japanese translation and partial English translation.

Japanese Office Action dated Jul. 22, 2003, with partial English translation.

* cited by examiner

*Primary Examiner*—Long Pham
*Assistant Examiner*—Shrinivas Rao
(74) *Attorney, Agent, or Firm*—McGinn & Gibb, PLLC (57) ABSTRACT

Liquid crystal in an in-plane switching type active matrix liquid crystal display unit has elastic coefficients $K_{11}$ and $K_{33}$ which respectively concern a spray deformation and a bent deformation of the liquid crystal layer, wherein one of the elastic coefficients $K_{11}$ and $K_{33}$ is fallen within the range between 6 pN and 25 pN or the range between 5 pN and 20 pN; otherwise, the square root of the product between the elastic coefficients $K_{11}$ and $K_{33}$ is fallen within the range between 5 pN and 20 pN, thereby improving the luminance through restricting the spray deformation and/or the bent deformation.

27 Claims, 7 Drawing Sheets

Fig. 12

ACTIVE MATRIX LIQUID CRYSTAL DISPLAY UNIT HAVING LIQUID CRYSTAL MOLECULES LESS ARRANGED LIKE SPRAY PATTERN AND ALONG BENT LINE

FIELD OF THE INVENTION

This invention relates to a liquid crystal display unit and, more particularly, to an in-plane switching type active matrix liquid crystal display unit.

DESCRIPTION OF THE RELATED ART

A full-color in-plane switching type active matrix liquid crystal display unit is broken down into a pair of substrate structures and liquid crystal filling the gap between the substrate structures. Pixel electrodes and the common electrode are patterned in one of the substrate structures, and the pixel electrodes are offset from the common electrode like a comb in a direction parallel to the substrates. Each pixel electrode and associated part of the common electrode form a pixel together with a piece of liquid crystal thereover, and black light is radiated through one of the substrate structure, the liquid crystal layer and the other substrate structure. When a potential difference is applied between selected ones of the pixel electrodes and the associated parts of the common electrode, effective local electric fields are created in the liquid crystal thereover, and are directed substantially in parallel to the substrates in the liquid crystal layer. For this reason, the liquid crystal molecules are rotated on virtual planes in parallel to the substrates, and a visual image is produced on the matrix of pixels. User sees the visual image in the direction parallel to the minor axes of the liquid crystal at all times, and achieves a wide view angle.

The wide view angle is the advantage of the in-plane switching type active matrix liquid crystal display unit. However, a problem is encountered in the prior art in-plane switching type active matrix liquid crystal display unit in the low luminance. The low luminance is derived from a low aperture ratio, and the non-transparent comb-like electrodes are causative of the low aperture ratio. The reason why the comb-like electrodes are formed of non-transparent material is that the comb-like electrodes are expected to put the discrination line out of sight.

A waved pixel electrode is proposed in Japanese Patent Application laid-open No. 11-030784. The pixel electrode disclosed in the Japanese Patent Application laid-open has waved teeth bent three times to eleventh times. The waved teeth offer optical paths to the back light, and the prior art in-plane switching type active matrix liquid crystal display unit is improved in aperture ratio by virtue of the waved teeth of the pixel electrode. However, the waved pixel electrode makes the fabrication process complicated.

SUMMARY OF THE INVENTION

It is therefore an important object of the present invention to provide an in-plane switching type liquid crystal display unit, which is improved in luminance through an approach different from the approach proposed in the Japanese Patent Application laid-open.

The present inventor had been making research and development efforts on an in-plane switching type liquid crystal display unit, and found that the low luminance was due to not only the low aperture ratio but also weak anisotropy of refractive index Δn of the liquid crystal layer. The present inventor investigated the local electric field in the liquid crystal of the pixel. Although the local electric field was partially directed in parallel to the substrates, there was a region where the liquid crystal was dominated by the vertical component of the local electric field. The liquid crystal molecules in the region made the anisotropy of refractive index Δn weak. Thus, the low luminance was resulted from the weak anisotropy of refractive index Δn as well as the low aperture ratio.

The weak anisotropy of refractive index Δn was described in detail with reference to FIGS. 1 and 2. The prior art in-plane switching type active matrix liquid crystal display unit had the liquid crystal 70 between the substrate structures 300 and 400. The substrate structure 300 included a transparent substrate 51, and a common electrode 53 was patterned on the major surface of the transparent substrate 51. The common electrode 53 was connected to a source of constant voltage (not shown). The common electrode 53 was covered with an insulating layer 54, and pixel electrodes 58 were patterned on the insulating layer 54. Though not shown in FIGS. 1 and 2, thin film transistors were fabricated on the transparent substrate 51, and the pixel electrodes 58 were selectively connected to data lines. The pixel electrodes 58, the thin film transistors and the data lines were covered with a passivation layer 60, and an orientation layer 61 was laminated on the passivation layer 60. The other substrate structure 400 also had a transparent substrate 71. The transparent substrate 71 was sandwiched between a conductive layer 490 and color filters 73, and an insulating layer 74 was sandwiched between the color filters 73 and an orientation layer 61. The pixel electrode 58 and the part of the common electrode 53 were incorporated in a pixel, and were aligned with one of the red, green blue color filters 73. The substrate structure 300 was spaced from the other substrate structure 400 by means of spacers and a sealing layer, and the liquid crystal 70 was confined in the space between the substrate structures 300 and 400. The resultant structure was sandwiched between polarization plates 380 and 480. The liquid crystal molecules 70 were represented by columns.

Figure 1:
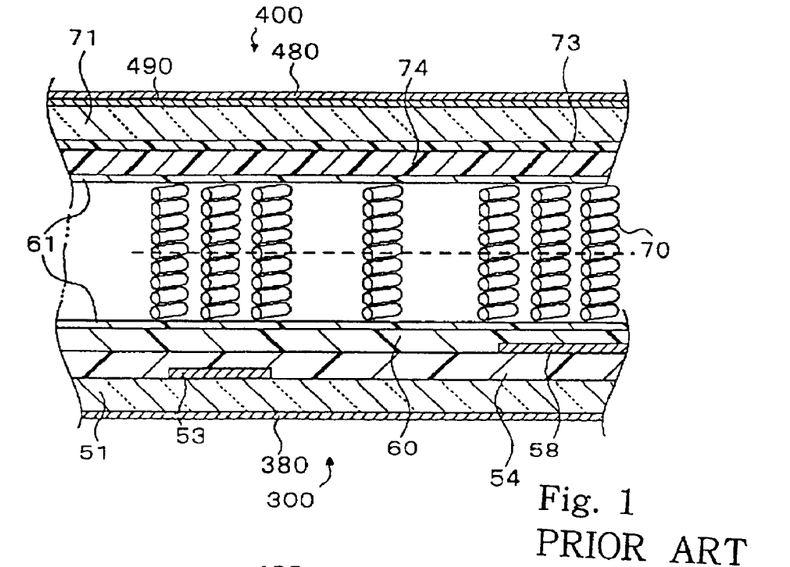
FIG. 1 is a cross sectional view showing the structure of a pixel incorporated in the prior art in-plane switching type active matrix liquid crystal display unit in the absence of any potential difference between the pixel electrode and the common electrode.

While the thin film transistor (not shown) was isolating the pixel electrode 58 from the associated data line, the liquid crystal molecules 70 was uniformly oriented in parallel to the initial orientation angle as shown in FIG. 1, and did not permit the back light to pass therethrough. As a result, the pixel was seen in black. When the thin film transistor turned on, the potential level on the associated data line was propagated to the pixel electrode 58, and a potential—difference took place between the common electrode 53 and the pixel electrode 58. A local electric field was created in the liquid crystal 70, and was directed as indicated by thick real lines in FIG. 2. The liquid crystal changed their attitude as shown in FIG. 2. The local electric field in the vicinity of the peripheries of the common/pixel electrodes 53/58 was not in parallel to the transparent substrate 51, but the vertical component was dominative. For this reason, the liquid crystal molecules 70 were raised in the vicinity of the periphery of the common electrode 53 and the periphery of the pixel electrode 58.

The transmittance was expressed for the in-plane switching type liquid crystal display unit by equation 1 as taught in IDW'99, page 187.

$$T/TO = \sin^2(2\alpha)\sin^2(\pi d \Delta n/\lambda) \qquad \text{Equation 1}$$

where T/T was the transmittance, α was the angle over which the liquid crystal molecules were rotated from the axis of the polarizing plate, d was the effective cell gap, Δn was the anisotropy of refractive index and λ was the wavelength of the incident light. The liquid crystal molecules raised due to the vertical component caused the anisotropy of refractive index Δn to be low. As a result, the luminance was lowered.

Figure 2:
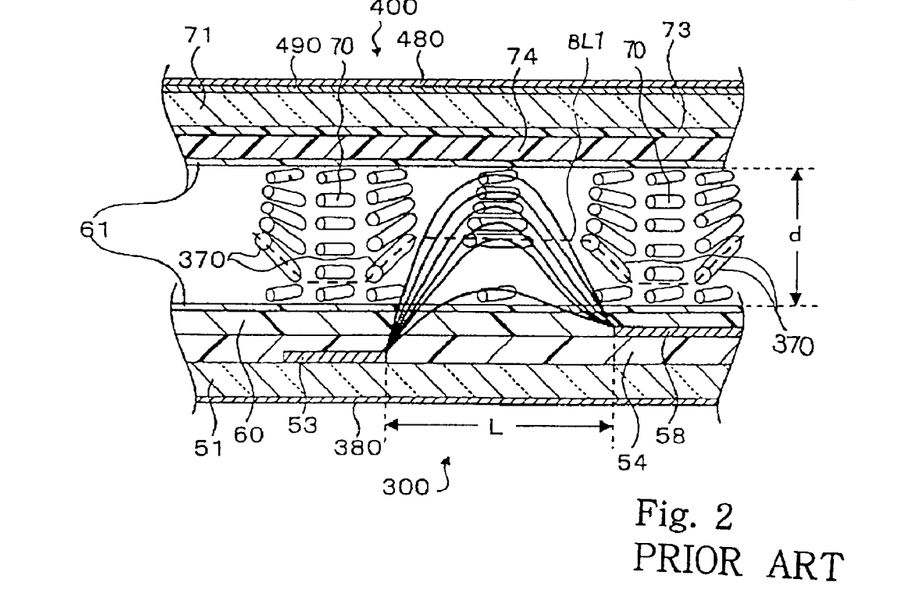
FIG. 2 is a cross sectional view showing the structure of the pixel incorporated in the prior art in-plane switching type active matrix liquid crystal display unit in the presence of the potential difference between the pixel electrode and the common electrode.

Although the liquid crystal 70 over the central areas of the electrodes 53/58 were twisted in virtual planes parallel to the transparent substrates 51/71 due to the electric field directed in parallel to the transparent substrates 51/71, the liquid crystal molecules 370 in the vicinity of the periphery of the electrodes 53/58 were arranged like a spray pattern, and the major axes of the liquid crystal molecules 370 were directed along broken line BL1 (see FIG. 2). Those liquid crystal molecules were to be influential in the luminance. However, the liquid crystal molecules 370 arranged like the spray pattern and directed along the broken line BL1 were not taken into account in the prior art in-plane switching type active matrix liquid crystal display units. For example, the threshold voltage Ec was expressed in Japanese Patent Application laid-open No. 11-030784 as $$Ec = \pi/d \times \sqrt{[K_{22}/(\in 0 * \Delta \in)]} \qquad \text{Equation 2}$$

where Ec was the threshold voltage, d was the effective cell gap, ∈0 was the dielectric constant in vacuum, Δ∈ was the anisotropy of dielectric constant of the liquid crystal and $K_{22}$ was the twist elastic coefficient. The twist elastic coefficient and the anisotropy Δ∈ were taken into account, and recommended to be fallen within appropriate ranges. An example of the range for the twist elastic coefficient was taught in Japanese Patent Application of laid-open No. 7-306417, and was expressed as $K_{22}/\Delta\in < 9.0 \times 10^{-8}$ (dyn). The local electric field in parallel to the transparent substrates gave rise to turn of the liquid crystal molecules on the virtual planes parallel to the transparent substrates in the in-plane switching type liquid crystal display unit. The threshold voltage $V_{TH}$ for a twisted nematic liquid crystal display unit was expressed as $$V_{TH} = \pi \sqrt{\{[K_{11} + (K_{33} - 2K_{22})/4]/(\in 0 * \Delta \in)\}} \qquad \text{Equation 3}$$

Equation 3 had the expression from which the elastic coefficients $K_{11}$ and $K_{33}$ were eliminated. Thus, it was clear that the spray pattern and the orientation along the broken line BL1 were not taken into account for the in-plane switching type liquid crystal display unit. The present inventor investigated the cause of the reduction in luminance in the in-plane switching type liquid crystal display unit. However, the present inventor could not find any document in which the spray pattern and the orientation had been specified as the cause of the reduction in luminance. The arrangement like the spray pattern is hereinbelow referred to as "spray deformation" of the liquid crystal layer, and the orientation along broken line BL1 is referred to as "bent deformation" of the liquid crystal layer.

To accomplish the object, the present invention proposes to restrict the spray deformation and the bent deformation.

In accordance with one aspect of the present invention, there is provided an in-plane switching type liquid crystal display unit comprising a pair of substrate structures having at least plural pixel electrodes and a common electrode on one of the substrate structures thereof and a liquid crystal layer sandwiched between said substrate structures and having a first elastic coefficient concerning a deformation like a spray pattern and fallen within the range expressed as 6 pico-newton<the first elastic coefficient<25 pico-newton.

In accordance with another aspect of the present invention, there is provided an in-plane switching type liquid crystal display unit comprising a pair of substrate structures having at least plural pixel electrodes and a common electrode on one of the substrate structures thereof, and a liquid crystal layer sandwiched between the substrate structures and having a first elastic coefficient concerning a deformation like a bent line and fallen within the range expressed as 5 pico-newton<the first elastic coefficient<20 pico-newton.

In accordance with yet another aspect of the present invention, there is provided an in-plane switching type liquid crystal display unit comprising a pair of substrate structures having at least plural pixel electrodes and a common electrode on one of the substrate structures thereof and a liquid crystal layer sandwiched between the substrate structures and having a first elastic coefficient concerning a deformation like a spray pattern and a second elastic coefficient concerning a deformation like a bent line, and the square root of the product between the first elastic coefficient and the second elastic coefficient is fallen within the range expressed as 5 pico-newton<SQRT<20 pico-newton where SQRT is the square root of the product between the first elastic coefficient and the second elastic coefficient.

BRIEF DESCRIPTION OF THE DRAWINGS

The features and advantages of the liquid crystal display unit will be more clearly understood from the following description taken in conjunction with the accompanying drawings in which.

DESCRIPTION OF THE PREFERRED EMBODIMENTS

First Embodiment

Figure 3:
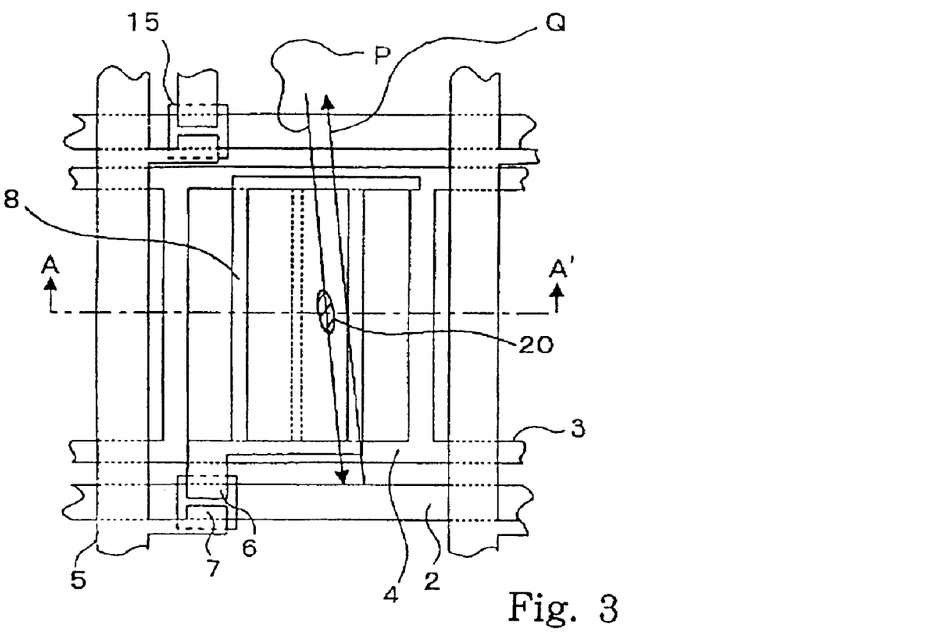
FIG. 3 is a plane view showing the layout of electrodes incorporated in an in-plane switching type active matrix liquid crystal display unit according to the present invention.
Figure 4:
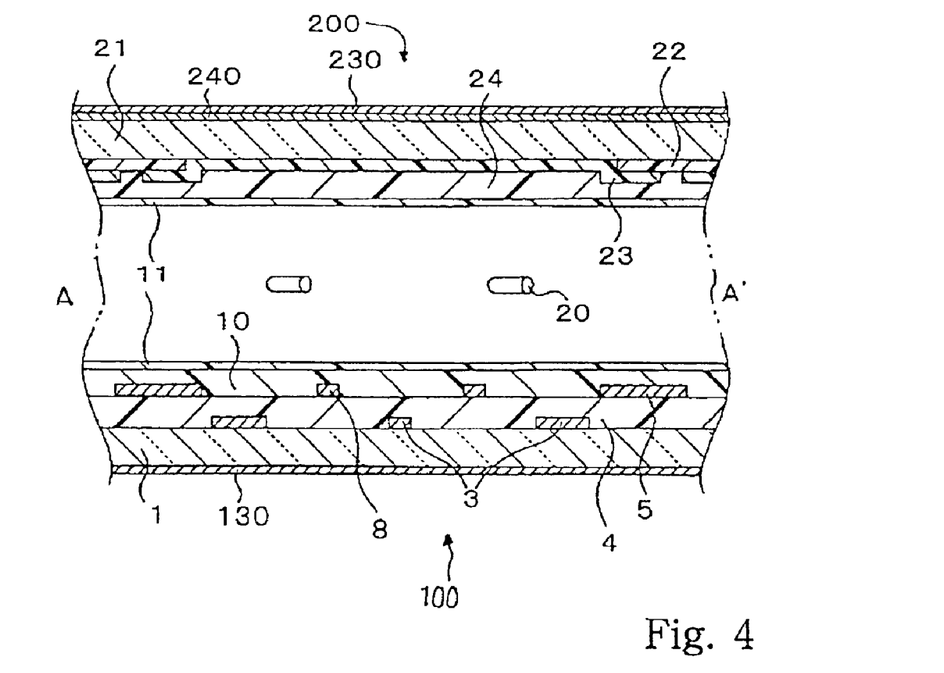
FIG. 4 is a cross sectional view taken along line A-A' of FIG. 3 and showing the structure of the in-plane switching type active matrix liquid crystal display unit.

Referring to FIGS. 3 and 4 of the drawings, an in-plane switching type active matrix liquid crystal display unit embodying the present invention largely comprises a pair of substrate structures 100/200, spacers (not shown), a sealing layer (not shown) and liquid crystal 20. The substrate structure 100 is spaced from the other substrate structure 200 by means of the spacers (not shown) and the sealing layer (not shown), and an inner space takes place between the substrate structures 100 and 200. The sealing layer extends along the peripheries of the substrate structures 100 and 200, and spacers are scattered inside of the sealing layer. The spacers make the cell gap or the liquid crystal layer of the order of 4.5 microns thick. In this instance, the liquid crystal 20 has the elastic coefficient $K_{11}$, which is fallen within the range between 6 pN and 25 pN. Unit pN stands for "piconewton".

A plurality of pixels are arranged in matrix in the assemblage of the substrate structures 100/200, and a visual image or images are produced on the matrix of pixels. Electrodes of a pixel are shown in FIG. 3. Description is focused on the pixel for the sake of simplicity. A local electric field is created in a piece of liquid crystal 20 of the pixel in the presence of a potential difference between comb-like electrodes patterned in the substrate structure 100 together with thin film transistor, and a color filter is formed in the other substrate structure 200.

The substrate structure 100 includes a transparent substrate 1, and a gate electrode 2 and a common electrode 3 are patterned on the major surface of the transparent substrate 1. The common electrode 3 is of the order of 400 nanometers thick. The transparent substrate 1 is, by way of example, formed of glass, and is of the order of 0.7 millimeter thick. A polarizing plate 130 is attached to the back surface of the transparent substrate 1, and is of the order of 0.2 millimeter thick. The gate electrode 2 and the common electrode 3 are covered with an insulating layer 4 of the order of 500 nanometers thick, and an amorphous silicon layer is patterned on the insulating layer 4 over a part of the gate electrode 2. In this instance, the insulating layer 4 is formed of silicon nitride expressed as SiNx. A data line 5, a source electrode 6, a drain electrode 7 and a pixel electrode 8 are patterned on the insulating layer 4. The data line 5 and the pixel electrode 8 are of the order of 200 nanometers thick. The source electrode 6, the drain electrode 7 and the data line 5 are formed of non-transparent material such as, for example, chromium, and the pixel electrode 8 is formed of conductive transparent material such as, for example, indium tin oxide. The pixel electrode 8 is arranged in such a manner as to be offset from an associated part of the common electrode 3. The distance between the pixel electrode 8 and the part of the common electrode 3 is of the order of 7 microns. The source electrode 6 is held in contact with the source region in the amorphous silicon layer, and the drain electrode 7 is held in contact with the drain region in the amorphous silicon layer. The source electrode 6 is integral with the pixel electrode 3, and the drain electrode 7 is integral with the data line 5. The part of gate electrode 2, the insulating layer 4, the amorphous silicon layer, the source electrode 6 and the drain electrode 7 as a whole constitute the thin film transistor. The data line 5, the source electrode 6, the drain electrode 7 and the pixel electrode 8 are covered with a passivation layer 10, and an orientation layer 11 is laminated on the passivation layer 10. In this instance, the passivation layer 10 is formed of silicon nitride SiNx, and is of the order of 300 nanometers thick. The orientation layer 11 is of the order of 50 nanometers thick The other substrate structure 200 includes a transparent substrate 21. The transparent substrate 21 is, by way of example, formed of glass, and is of the order of 0.7 millimeter thick. The transparent glass 21 is sandwiched between black matrix/color filter 22/23 and a conductive layer 240. The black matrix 22 is of the order of 1 micron thick, and the color filter 23 is also of the order of 1 micron thick. The conductive layer 240 is overlain by a polarizing plate 230, and the black matrix 22 and the color filter 23 are covered with an insulating layer 24 of the order of 1 micron thick.

The polarizing plate 230 is of the order of 0.2 millimeter thick, and the conductive layer 240 is of the order of 50 nanometers thick. Apertures are formed in the black matrix 22, and each of the apertures is aligned with the pixel electrode 8 and the part of the common electrode 3. The aperture is closed with the color filter 23. The color filter 23 is either red, green or blue. The black matrix 22 and the color filter 23 are covered with an insulating layer 24, and the insulating layer 24 is formed of silicon nitride SiNx. The insulating layer 24 in turn is covered with an orientation layer 11 of the order of 50 nanometers thick.

The orientation layers 11 are formed by using an offset printing, and are subjected to rubbing. In this instance, the molecules of the orientation layer 11 in the substrate structure 100 is directed as indicated by arrow P, and the molecules of the orientation layer 11 in the other substrate structure 200 is directed as indicated by arrow Q. The liquid crystal molecules 20 are directed in parallel to the rubbing directions P/Q, and the polarizing plate 130 permits the light to pass in a direction parallel to the orientation of the liquid crystal molecules 20. On the other hand, the polarizing plate 230 has a light absorbing direction perpendicular to that of the other substrate structure 100.

The three pixels respectively aligned with the red, green blue filters 23 form in combination a pixel group. When potential differences are selectively applied between the three pixel electrodes and the common electrode 3, a dot variable from black to white is produced on the pixel group.

The present inventor evaluated the in-plane switching type active matrix display unit as follows. First, the present inventor fabricated samples of the in-plane switching type active matrix display panel shown in FIGS. 3 and 4. Although the samples were identical in structure, the liquid crystal in the samples was different in elastic coefficient $K_{11}$. An appropriate driving circuit and a back light source were connected to each of the samples, and the present inventor measured the optical characteristics of the samples of the in-plane switching type liquid crystal display panel.

The liquid crystal 20 had the following properties. The anisotropy of refractive index $\Delta n$ was 0.075. The anisotropy of dielectric constant $\Delta \in$ was 8.1. The viscosity was 90 mPa•s. The elastic coefficient $K_{11}$ concerns the spray deformation. On the other hand, the elastic coefficients $K_{22}$ and $K_{33}$ concern the twisting and the bend along the broken line BL1, respectively. The liquid crystal 20 had the elastic coefficient $K_{11}$ which was fallen within the range between 2.2 pN and 17.8 pN. The elastic coefficients $K_{22}$ and $K_{33}$ of the liquid crystal were 6.1 pN and 13.6 pN, respectively.

Figure 5:
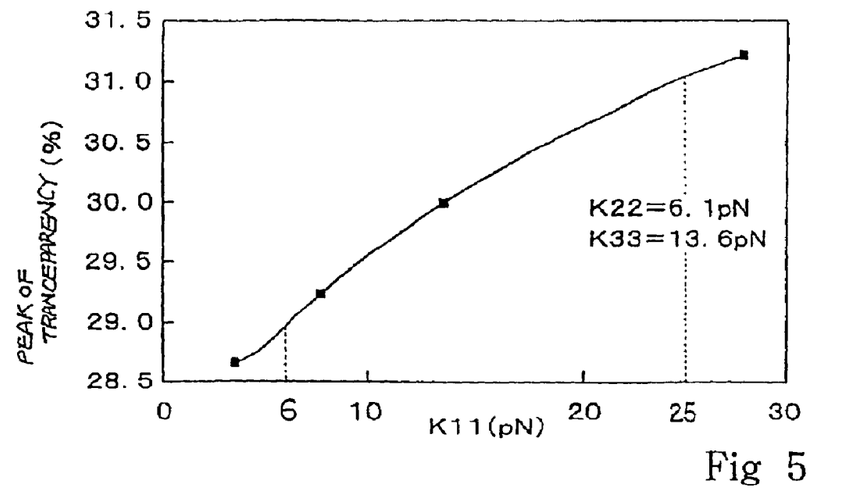
FIG. 5 is a graph showing a peak of transparency in terms of the elastic coefficient $K_{11}$.

First, the present inventor investigated the influence of the elastic coefficient $K_{11}$ on the peak of the transparency. The present inventor varied the potential difference between the pixel electrodes and the common electrode, and measured the transparency of the samples. The present inventor plotted the peak of the transparency of the samples as shown in FIG. 5. The present inventor found that the peak of the transparency was improved in the range between 6 pN and 25 pN. The increase of peak transparency was derived from the restriction of the spray deformation, because the liquid crystal with large elastic coefficient $K_{33}$ was effective against the spray deformation.

Figure 6:
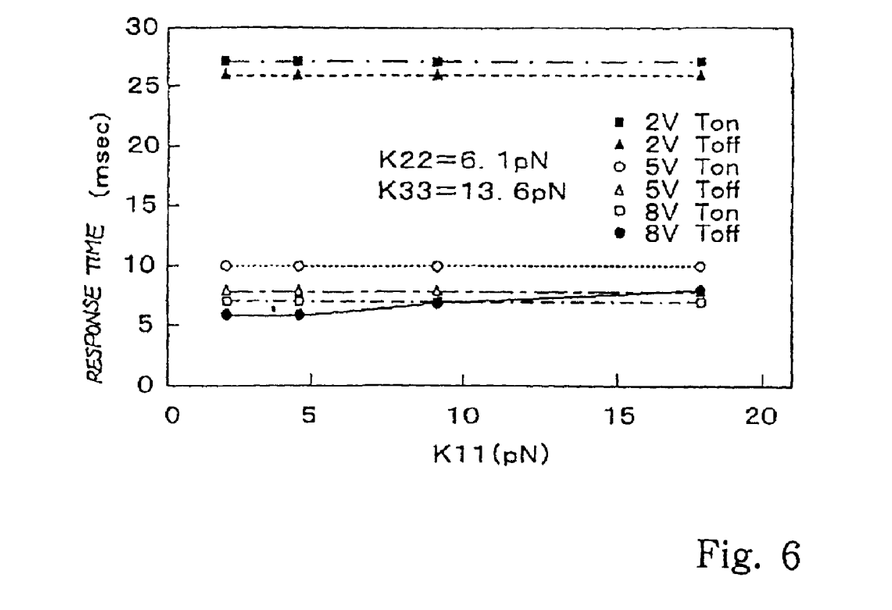
FIG. 6 is a graph showing relation between response times and the elastic coefficient $K_{11}$.

Subsequently, the present inventor measured response times Ton/Toff. The response time Ton was a time period from application of a potential difference between the pixel electrode and the common electrode to change of pixels from black to white. On the other hand, the response time Toff was a time period from removal of the potential difference to change of the pixels from white to black. The potential difference was 2 volts, 5 volts and 8 volts.

Using the samples of the in-plane switching type liquid crystal display panel, the present inventor measured the response times Ton and Toff. First, the potential difference of 2 volts was applied to the pixel electrodes and the common electrode, and the present inventor measured the response times Ton and Toff. The response time Ton at 2 volts was plotted as indicated by black squares, and the response time Toff at 2 volts was plotted as indicated by black triangles. Although the response times Ton and Toff were relatively long, the response times Ton and Toff were substantially constant regardless of the elastic coefficient $K_{11}$.

Subsequently, the potential difference was increased to 5 volts, and the present inventor measured the response times Ton and Toff. The response time Ton at 5 volts was represented by white circles, and the response time Toff at 5 volts was represented by white triangles. The potential difference was increased to 250 percent. Then, the response times Ton and Toff were decreased to 36–29 percent. However, the response times Ton and Toff were still constant regardless of the elastic coefficient $K_{11}$.

The present inventor increased the potential difference to 8 volts, and measured the response times Ton and Toff. The response time Ton at 8 volts was represented by white squares, and the response time Toff at 8 volts was varied as indicated by black circles. Although the potential difference was increased to 160 percent, the response times Ton and Toff were only decreased to about 70 percent. However, the response time Ton was substantially constant regardless of the elastic coefficient $K_{11}$, and the response time Toff was slightly increased. Thus, the present inventor confirmed that a designer was able to determine the response times Ton and Toff on the basis of the potential difference between the pixel electrodes and the common electrode without consideration of the elastic coefficient $K_{11}$ in most of the above-described range.

Figure 7:
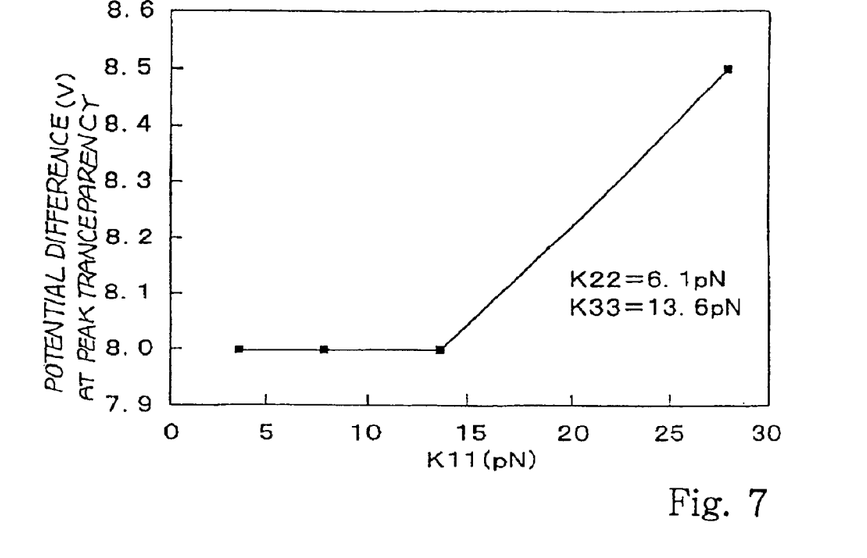
FIG. 7 is a graph showing relation between a potential difference at the peak transparency and the elastic coefficient $K_{11}$.

Subsequently, the present inventor investigated the dependency of the elastic coefficient $K_{11}$ on the potential difference at the peak transparency. The present inventor varied the potential difference between the pixel electrodes and the common electrode in each sample, and measured the transparency. The present inventor plotted the potential difference at the peak transparency as shown in FIG. 7. The potential difference at the peak transparency was substantially constant in so far as the elastic coefficient $K_{11}$ was relatively small. When taking FIG. 5 into account concurrently with FIG. 7, it was understood that the peak of transparency was increasable together with the elastic coefficient $K_{11}$ without increase of the potential difference between the pixel electrodes and the common electrode in so far as the elastic coefficient was equal to or less than 14 pN. Thus, when the elastic coefficient $K_{11}$ was in the range between 6 pN and 14 pN, the in-plane switching type active matrix liquid crystal display unit was improved in luminance without increase of the electric power consumption.

As will be understood from the foregoing description, the in-plane switching type active matrix liquid crystal display unit has the liquid crystal, the elastic coefficient $K_{11}$ of which ranges between 6 pN and 25 pN. The liquid crystal is effective against the spray deformation. Thus, the spray deformation is restricted in the in-plane switching type active matrix liquid crystal display unit according to the present invention. The liquid crystal layer achieves a high transparency in the local electric field created due to the potential difference between the pixel electrode and the common electrode. This results in a high luminance.

Second Embodiment

Another in-plane switching type active matrix liquid crystal display unit embodying the present invention contains liquid crystal, the elastic coefficient $K_{33}$ of which is fallen within the range between 3.9 pN and 27.2 pN. The elastic coefficient $K_{33}$ concerns the bent deformation of the liquid crystal layer. Other elastic coefficients $K_{11}$ and $K_{22}$ are 8.9 pN and 6.1 pN, respectively.

The in-plane switching type active matrix liquid crystal display unit implementing the second embodiment has the structure same as that of the in-plane switching type active matrix liquid crystal display unit shown in FIGS. 3 and 4. For this reason, no further description on the structure is incorporated hereinbelow. However, electrodes and layers of the in-plane switching type active matrix liquid crystal display unit implementing the second embodiment are labeled with the references designating the electrodes and layers incorporated in the in-plane switching type active matrix liquid crystal display unit shown in FIGS. 3 and 4 in the following description.

The present inventor fabricated samples of the in-plane switching type liquid crystal display unit implementing the second embodiment. The samples were different in elastic coefficient $K_{33}$. Using the samples, the present inventor evaluated the in-plane switching type active matrix liquid crystal display unit implementing the second embodiment.

Figure 8:
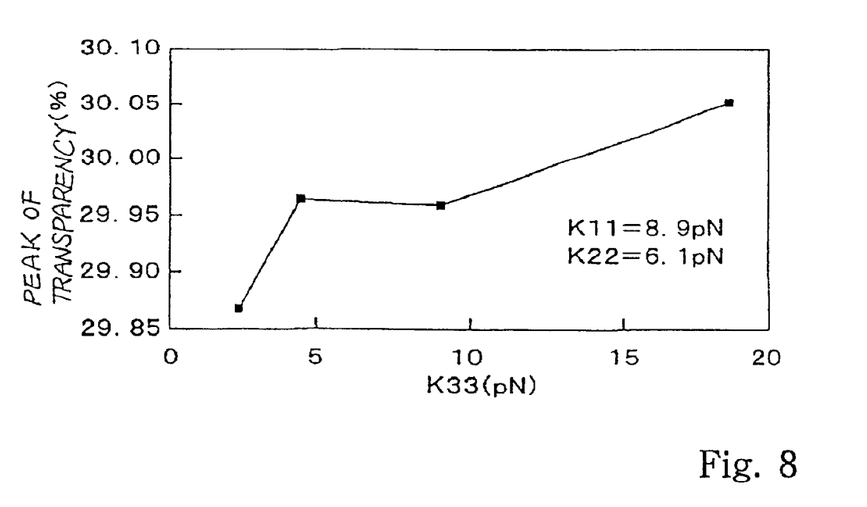
FIG. 8 is a graph showing relation between the peak of transparency and the elastic coefficient $K_{33}$ in another in-plane switching type active matrix liquid crystal display unit according to the present invention.

The present inventor assembled the samples with an appropriate driving circuit and a back light source. The present inventor varied a potential difference between the pixel electrodes 8 and the common electrode 3, and measured the peak of transparency of the liquid crystal layer 20. The transparency was plotted in terms of the elastic coefficient $K_{33}$ as shown in FIG. 8. The peak of transparency was drastically increased in the sample, the liquid crystal of which had the elastic coefficient $K_{33}$ of the order of 5pN. Although the peak of transparency was not increased until the elastic coefficient $K_{33}$ around 9 pN, the peak of transparency was increased together with the elastic coefficient $K_{33}$ thereafter. The present inventor confirmed that the rate of change was large until 20 pN. The experimental data taught us that the bent deformation was restricted in the liquid crystal layer.

Subsequently, the present inventor measured response times Ton/Toff. The pixel electrodes 8 and the common electrode 3 of each sample were applied with a potential difference 2 volts, 5 volts and 8 volts. First, the potential difference of 2 volts was applied to the pixel electrodes 8 and the common electrode 3, and the present inventor measured the response times Ton and Toff. The response time Ton at 2 volts was plotted as indicated by black squares in FIG. 9, and the response time Toff at 2 volts was plotted as indicated by black triangles. Although the response times Ton and Toff were relatively long, the response times Ton and Toff were substantially constant regardless of the elastic coefficient $K_{33}$.

Figure 9:
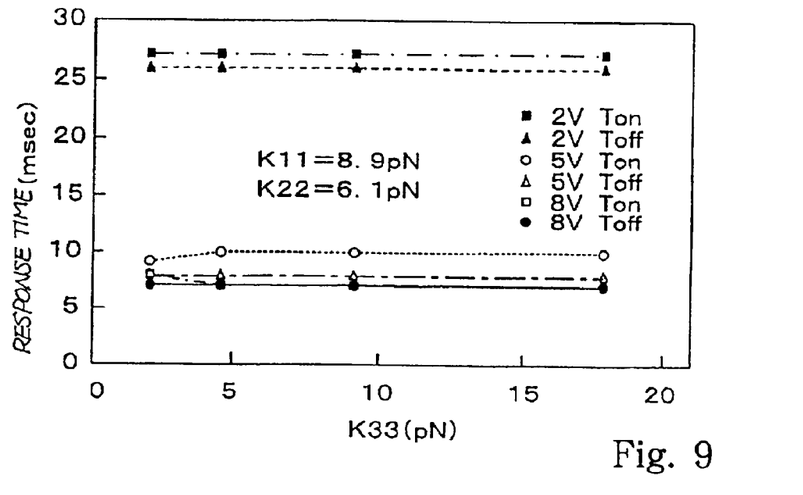
FIG. 9 is a graph showing relation between response times and the elastic coefficient $K_{33}$.

Subsequently, the potential difference was increased to 5 volts, and the present inventor measured the response times Ton and Toff, again. The response time Ton at 5 volts was represented by white circles, and the response time Toff at 5 volts was represented by white triangles. The potential difference was increased to 250 percent. Then, the response times Ton and Toff were decreased to 36–31 percent. Although the response time Ton was varied until 5 pN, the response times Ton and Toff were substantially constant regardless of the elastic coefficient $K_{33}$.

The present inventor increased the potential difference to 8 volts, and measured the response times Ton and Toff. The response time Ton at 8 volts was represented by white squares, and the response time Toff at 8 volts was varied as indicated by black circles. Although the potential difference was increased to 160 percent, the response times Ton and Toff were only decreased to 70–90 percent. Although the response time Ton was decreased until 5 pN, the response times Ton and Toff were substantially constant regardless of the elastic coefficient $K_{33}$. Thus, the present inventor confirmed that a designer was able to determine the response times Ton and Toff on the basis of the potential difference between the pixel electrodes 8 and the common electrode 3 without consideration of the elastic coefficient $K_{33}$ in most of the above-described range.

Figure 10:
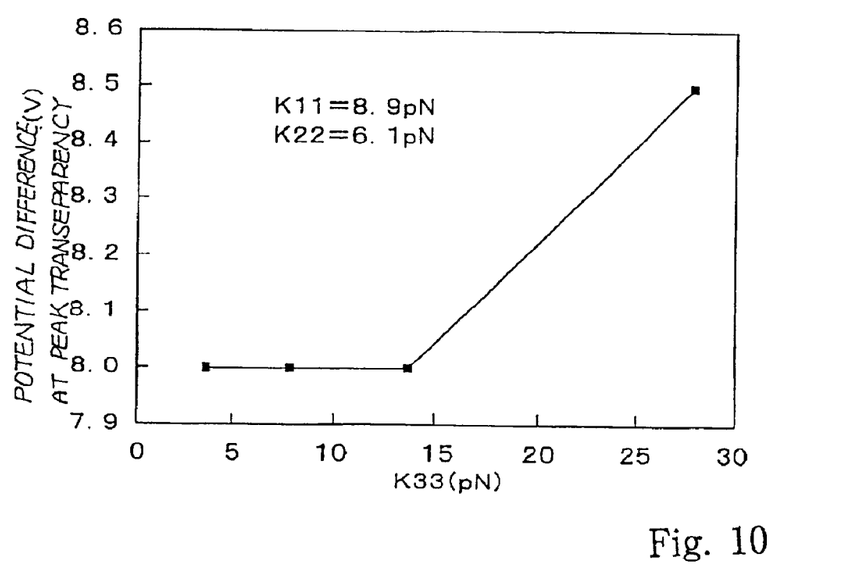
FIG. 10 is a graph showing relation between a potential difference at the peak transparency and the elastic coefficient $K_{33}$.

Subsequently, the present inventor investigated the dependency of the elastic coefficient $K_{33}$ on the potential difference at the peak transparency. The present inventor varied the potential difference between the pixel electrodes 8 and the common electrode 3 in each sample, and measured the transparency. The present inventor plotted the potential difference at the peak transparency as shown in FIG. 10. The potential difference at the peak transparency was substantially constant in so far as the elastic coefficient $K_{33}$ was relatively small. When taking FIG. 5 into account concurrently with FIG. 7, it was understood that the peak of transparency was increasable together with the elastic coefficient $K_{33}$ without increase of the potential difference between the pixel electrodes and the common electrode in so far as the elastic coefficient was equal to or less than 13.5 pN. Thus, the present inventor found that the in-plane switching type active matrix liquid crystal display unit was improved in luminance without increase of the power consumption in so far as the elastic coefficient $K_{33}$ was in the range between 5 pN and 13.5 pN.

As will be understood from the foregoing description, the elastic coefficient $K_{33}$ of the liquid crystal are fallen within the range between 5 pN and 20 pN in the in-plane switching type active matrix liquid crystal display unit implementing the second embodiment. The elastic coefficient $K_{33}$ in the range is effective against the bent deformation of the liquid crystal layer. In other words, the bent deformation is restricted in the in-plane switching type active matrix liquid crystal display unit. As a result, the transparency of the liquid crystal layer is enhanced, and, accordingly, the in-plane switching type active matrix liquid crystal display unit is improved in luminance by virtue of the liquid crystal layer.

Third Embodiment

Yet another in-plane switching type active matrix liquid crystal display unit embodying the present invention contains liquid crystal, the elastic coefficients $K_{11}$ and $K_{33}$ of which are fallen within a range according to the present invention. The square root of the product between elastic coefficients $K_{11}$ and $K_{33}$ is fallen within the range between 5 pN and 20 pN, i.e., 5 pN<SQRT($K_{11}*K_{33}$)<20 pN. The operation "square root" is abbreviated as "SQRT". The other elastic coefficient $K_{22}$ is 6.1 pN.

The in-plane switching type active matrix liquid crystal display unit implementing the third embodiment has the structure same as that of the in-plane switching type active matrix liquid crystal display unit shown in FIGS. 3 and 4. For this reason, no further description on the structure is incorporated hereinbelow. However, electrodes and layers of the in-plane switching type active matrix liquid crystal display unit implementing the third embodiment are labeled with the references designating the electrodes and layers incorporated in the in-plane switching type active matrix liquid crystal display unit shown in FIGS. 3 and 4 in the following description.

Figure 11:
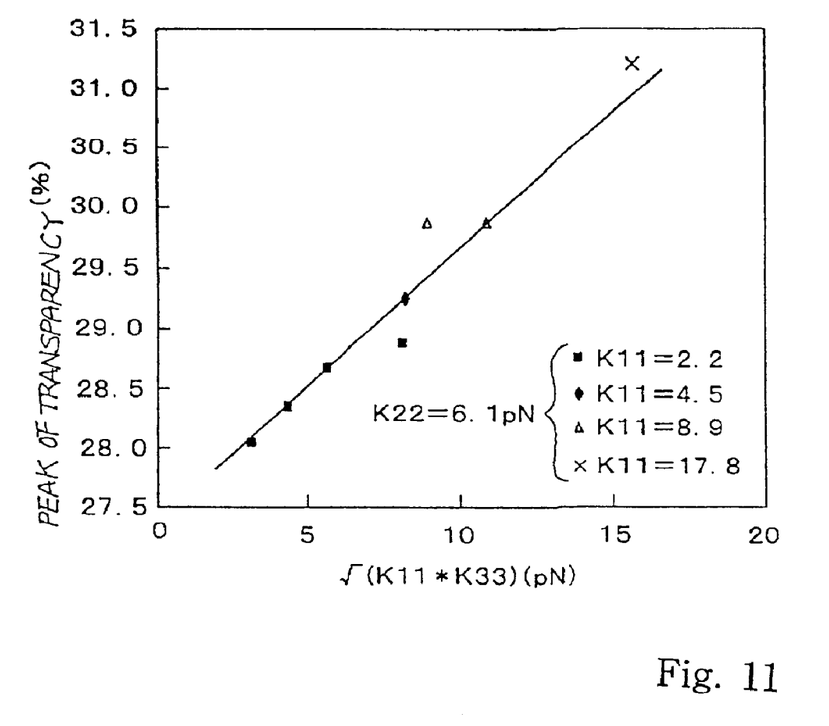
FIG. 11 is a graph showing relation between the peak of transparency and the square root of the product between the elastic coefficients $K_{11}$ and $K_{33}$ in yet another in-plane switching type active matrix liquid crystal display unit according to the present invention.

The present inventor fabricated samples of the in-plane switching type active matrix liquid crystal display unit implementing the third embodiment. The liquid crystal in the samples was different in the square root of the product between the elastic coefficients $K_{11}$ and $K_{33}$. The present inventor assembled the samples with a driving circuit and a back light source. The present inventor varied the potential difference between the pixel electrodes 8 and the common electrode 3, and measured the transparency of the liquid crystal layer. The present inventor determined the peak of transparency of each sample, and plotted the peak of transparency in terms of the square root of the product between the elastic coefficients $K_{11}$ and $K_{33}$ as show in FIG. 11. The peak of the transparency was increased together with the square root of the product between the elastic coefficients $K_{11}$ and $K_{33}$. The present inventor confirmed that the rate of change was large between 5 pN and 20 pN. The experimental data taught us that both of the spray deformation and the bent deformation were restricted by virtue of the liquid crystal 20 fallen within the range.

In the first to third embodiments, the liquid crystal 20 was selected in such a manner that one of or both of the elastic coefficients $K_{11}$ and $K_{33}$ were fallen within the range. The present inventor found that the regulation was easy when the elastic coefficients $K_{11}$ and $K_{33}$ satisfied the following inequality.

$$0.5<(\sqrt{(K_{11} \times K_{33})})/K_{22}<2.0$$

Behavior of In-Plane Switching Type Active Matrix Liquid Crystal Display Unit

Figure 12:
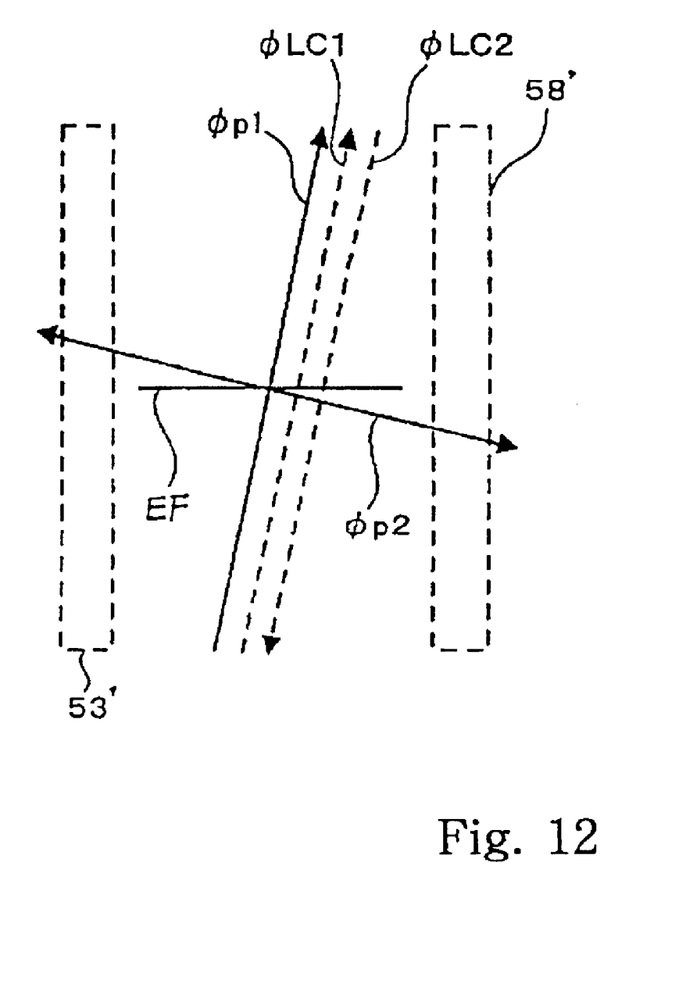
FIG. 12 is a plane view showing the orientation of liquid crystal molecules and polarizing plates incorporated in any one of the in-plane switching type active matrix liquid crystal display units according to the present invention.

Although three embodiments have been described with reference to the associated figures, the liquid crystal molecules in the in-plane switching type active matrix liquid crystal display units behaves as follows. FIG. 12 shows a pixel electrode and a common electrode. The common electrode and the pixel electrode are positioned in the area labeled with reference numerals 53' and 58', respectively. If the liquid crystal 70 is used in the in-plane switching type active matrix liquid crystal display unit, the vertical cross section is similar to those shown in FIGS. 1 and 2. The substrate structure where the thin film transistors, data lines, pixel electrodes and common electrode are formed is hereinbelow referred to as "thin film transistor substrate structure", and the other substrate structure where the black matrix and color filters are formed is referred to as "color filter substrate structure".

As described hereinbefore, the polarization plates are formed on the outer surfaces of the substrate structures, respectively, and the orientation layers are laminated on the inner surfaces of the substrate structures. The orientation layers have been subjected to the rubbing, and have influence on the liquid crystal molecules at the boundaries between the liquid crystal layer and the orientation layers. The liquid crystal have a positive anisotropy of dielectric constant.

The polarization plate on the thin film transistor substrate structure is arranged in such a manner as to absorb the polarized light directed in Φp1, and the other polarization plate on the color filter substrate structure is arranged in such a manner as to absorb the polarized light directed in Φp2. The direction Φp1 is substantially perpendicular to the direction Φp2. The liquid crystal molecules at the boundary between the liquid crystal layer and the thin film transistor substrate structure have the major axes or the optical direction directed in parallel to ΦLC1. On the other hand, the liquid crystal molecules at the boundary between the liquid crystal layer and the color filter substrate structure have the major axes directed in parallel to ΦLC2. Thus, the liquid crystal molecules at the boundaries are in anti-parallel, i.e., ΦLC1=ΦLC2.

Assuming now that any potential difference is not applied between the pixel electrode at the area 58' and the common electrode at the area 53', the liquid crystal molecules are directed at a certain angle with respect to the longitudinal direction of the electrodes. The certain angle is greater than 45 degrees and less than 90 m degrees. The attitude of liquid crystal molecules is similar to that shown in FIG. 1.

When a potential difference is applied between the pixel electrode and the common electrode, the local electric field is created in the liquid crystal layer, and line EF is representative of the direction of the local electric field. The liquid crystal molecules change the direction from ΦCL1=ΦLC2 to the direction Φp2. As a result, the liquid crystal layer changes the transparency.

As will be appreciated from the foregoing description, at least one of the elastic coefficients $K_{11}/K_{33}$ fallen within the range is effective against the spray deformation and/or the bent deformation. The in-plane switching type liquid crystal display unit according to the present invention contains the liquid crystal with at least one of the elastic coefficients $K_{11}/K_{33}$ fallen within the range so that the spray deformation and/or the bent deformation is restricted. This results in a high luminance.

Although the vertical component of the local electric field influences the liquid crystal molecules in the vicinity of the periphery of the electrodes, the elastic coefficients $K_{11}$ and/or $K_{33}$ does not permit the vertical component to deform the liquid crystal layer like the spray pattern and/or along the broken line BL1 (see FIG. 2). For this reason, the liquid crystal display fully exhibits the anisotropy of refractive index $\Delta n$, and, accordingly, the luminance is surely improved.

Although particular embodiments of the present invention have been shown and described, it will be apparent to those skilled in the art that various changes and modifications may be made without departing from the spirit and scope of the present invention.

In case where the response time Ton is to be improved, it is appropriate to use the liquid crystal with a positive anisotropy of dielectric constant. However, if the response time Toff may be improved in another in-plane switching type active matrix liquid crystal display unit.

In the above-described embodiments, the cell gap and the distance between the pixel electrode and the common electrode are adjusted to 4.5 microns and 7 microns, respectively. The present inventor confirmed that the liquid crystal according to the present invention achieved a high luminance on the conditions where the cell gap and the distance between the electrodes ranged from 1.0 micron to 6.0 microns and from 2 microns to 15 microns, respectively.

The liquid crystal regulated in accordance with the present invention is effective against the spray deformation and/or the bent deformation in the in-plane switching type liquid crystal display unit. The embodiments never set a limit on the present invention. The liquid crystal according to the present invention may be used in another kind of the in-plane switching type liquid crystal display unit. For example, the color filters and the black matrix may be incorporated in the substrate structure together with the thin film transistors, pixel electrodes etc. The color filters may be deleted from the in-plane switching type liquid crystal display unit according to the present invention.

What is claimed is:

1. An in-plane switching type liquid crystal display unit comprising:
   a pair of substrate structures comprising at least plural pixel electrodes and a common electrode on one of said substrate structures; and
   a liquid crystal layer sandwiched between said substrate structures and having a splay elastic coefficient within the range expressed as:

$$6\ \text{pico-newton} < \text{said splay elastic coefficient} < 25\ \text{pico-newton}$$

for improving a luminance of said in-plane switching type liquid crystal display unit.

2. The in-plane switching type liquid crystal display unit as set forth in claim 1, in which the liquid crystal of said liquid crystal layer has a positive anisotropy of dielectric constant.

3. The in-plane switching type liquid crystal display unit as set forth in claim 1, in which said liquid crystal further has a bend elastic coefficient and a twist elastic coefficient, and said splay elastic coefficient, said bend elastic coefficient and said twist elastic coefficient satisfy an inequality expressed as:

$$0.5 < (\sqrt{\ }(K_{11} \times K_{33})/K_{22}) < 2.0$$

where $K_{11}$ is said splay elastic coefficient, $K_{33}$ is said bend elastic coefficient and $K_{22}$ is said twist elastic coefficient.

4. The in-plane switching type liquid crystal display unit as set forth in claim 1, in which said substrate structures are spaced from each other by a distance ranging from 1.0 micron to 6.0 microns.

5. The in-plane switching type liquid crystal display unit as set forth in claim 1, in which an electric field is created between each of said plural pixel electrodes and a part of said common electrode under application of a potential difference therebetween, and each of said plural pixel electrodes is spaced from said part of said common electrode in a direction parallel to inner surfaces of said substrate structures by a distance ranging from 2 microns to 15 microns.

6. The in-plane switching type liquid crystal display unit as set forth in claim 1, in which said substrate structures are spaced from each other by a first distance ranging from 1.0 micron to 6.0 microns, and each of said plural pixel electrodes and an associated part of said common electrode is spaced from each other in a direction parallel to inner surfaces of said substrate structures by a second distance ranging from 2 microns to 15 microns.

7. The in-plane switching type liquid crystal display unit as set forth in claim 1, in which said plural pixel electrodes, parts of said common electrode respectively associated with said plural pixel electrodes and pieces of said liquid crystal layer respectively overlapped with combinations of said plural pixel electrodes and said parts form in combination plural pixels arranged in a matrix.

8. The in-plane switching type liquid crystal display unit as set forth in claim 7, further comprising color filters selectively put in the primary three colors and contained in said plural pixels, respectively.

9. The in-plane switching type liquid crystal display unit as set forth in claim 8, in which said plural pixel electrodes and said common electrode are formed on said one of said substrate structures together with data lines and thin film transistors selectively connected between said data lines and said pixel electrodes, and said color filters are formed on the other of said substrate structures together with a black matrix.

10. An in-plane switching type liquid crystal display unit comprising:
    a pair of substrate structures comprising at least plural pixel electrodes and a common electrode on one of the substrate structures; and
    a liquid crystal layer sandwiched between said substrate structures and having a bend elastic coefficient within the range expressed as:

$$5\ \text{pico-newton} < \text{said bend elastic coefficient} < 20\ \text{pico-newton}$$

for improving a luminance of said in-plane switching type liquid crystal display unit.

11. The in-plane switching type liquid crystal display unit as set forth in claim 10, in which the liquid crystal of said liquid crystal layer has a positive anisotropy of dielectric constant.

12. The in-plane switching type liquid crystal display unit as set forth in claim 10, in which said liquid crystal further has a splay elastic coefficient and a twist elastic coefficient, and said bend elastic coefficient, said splay elastic coefficient and said twist elastic coefficient satisfy an inequality expressed as:

$$0.5 < (\sqrt{\ }(K_{11} \times K_{33})/K_{22}) < 2.0$$

where $K_{11}$ is said splay elastic coefficient, $K_{33}$ is said bend elastic coefficient and $K_{22}$ is said twist elastic coefficient.

13. The in-plane switching type liquid crystal display unit as set forth in claim 10, in which said substrate structures are spaced from each other by a distance ranging from 1.0 micron to 6.0 microns.

14. The in-plane switching type liquid crystal display unit as set forth in claim 10, in which an electric field is created between each of said plural pixel electrodes and a part of said common electrode under application of a potential difference therebetween, and each of said plural pixel electrodes is spaced from said part of said common electrode in a direction parallel to inner surfaces of said substrate structures by a distance ranging from 2 microns to 15 microns.

15. The in-plane switching type liquid crystal display unit as set forth in claim 10, in which said substrate structures are spaced from each other by a first distance ranging from 1.0 micron to 6.0 microns, and each of said plural pixel electrodes and an associated part of said common electrode is spaced from each other in a direction parallel to inner surfaces of said substrate structures by a second distance ranging from 2 microns to 15 microns.

16. The in-plane switching type liquid crystal display unit as set forth in claim 10, in which said plural pixel electrodes, parts of said common electrodes respectively overlapped with combinations of said plural pixel electrodes and said parts form in combination plural pixels arranged in a matrix.

17. The in-plane switching type liquid crystal display unit as set forth in claim 16, further comprising color filters selectively put in the primary three colors and contained in said plural pixels, respectively.

18. The in-plane switching type liquid crystal display unit as set forth in claim 17, in which said plural pixel electrodes and said common electrode are formed on said one of said substrate structures together with data lines and thin film transistors selectively connected between said data lines and said pixel electrodes, and said color filters are formed on the other of said substrate structures together with a black matrix.

19. An in-plane switching type liquid crystal display unit comprising:
a pair of substrate structures comprising at least plural pixel electrodes and a common electrode on one of said substrate structures; and
a liquid crystal layer sandwiched between said substrate structures and having a splay elastic coefficient and a bend elastic coefficient are selected such that, the square root of the product between said splay elastic coefficient and said bend elastic coefficient within the range expressed as:

$$5 \text{ pico-newton} < SQRT < 20 \text{ pico-newton}$$

where SQRT is said square root of the product between said splay elastic coefficient and said bend elastic coefficient for improving a luminance of said in-plane switching type liquid crystal display unit.

20. The in-plane switching type liquid crystal display unit as set forth in claim 19, in which the liquid crystal of said liquid crystal layer has a positive anisotropy of dielectric constant.

21. The in-plane switching type liquid crystal display unit as set forth in claim 19, in which said liquid crystal further has a twist elastic coefficient, and said splay elastic coefficient, said bend elastic coefficient and said twist elastic coefficient satisfy an inequality expressed as:

$$0.5 < (\sqrt{(K_{11} \times K_{33})}/K_{22}) < 20$$

where $K_{11}$ is said splay elastic coefficient, $K_{33}$ is said bend elastic coefficient and $K_{22}$ is said twist elastic coefficient.

22. The in-plane switching type liquid crystal display unit as set forth in claim 19, in which said substrate structures are spaced from each other by a distance ranging from 1.0 micron to 6.0 microns.

23. The in-plane switching type liquid crystal display unit as set forth in claim 19, in which an electric field is created between each of said plural pixel electrodes and a part of said common electrode under application of a potential difference therebetween, and each of said plural pixel electrodes is spaced from said part of said common electrode in a direction parallel to inner surfaces of said substrate structures by a distance ranging from 2 microns to 15 microns.

24. The in-plane switching type liquid crystal display unit as set forth in claim 19, in which said substrate structures are spaced from each other by a first distance ranging from 1.0 micron to 6.0 microns, and each of said plural pixel electrodes and an associated part of said common electrode is spaced from each other in a direction parallel to inner surfaces of said substrate structures by a second distance ranging from 2 microns to 15 microns.

25. The in-plane switching type liquid crystal display unit as set forth in claim 19, in which said plural pixel electrodes, parts of said common electrode respectively associated with said plural pixel electrodes and pieces of said liquid crystal layer respectively overlapped with combinations of said plural pixel electrodes and said parts form in combination plural pixels arranged in a matrix.

26. The in-plane switching type liquid crystal display unit as set forth in claim 25, further comprising color filters selectively put in the primary three colors and contained in said plural pixels, respectively.

27. The in-plane switching type liquid crystal display unit as set forth in claim 26, in which said plural pixel electrodes and said common electrode are formed on one of said substrate structures together with data lines and thin film transistors selectively connected between said data lines and said pixel electrodes, and said color filters are formed on the other of said substrate structures together with a black matrix.

* * * * *